United States Patent

[11] 3,620,495

| [72] | Inventor | George Korab |
| | | Rockford, Ill. |
| [21] | Appl. No. | 851,025 |
| [22] | Filed | Aug. 18, 1969 |
| [45] | Patented | Nov. 16, 1971 |
| [73] | Assignee | Atwood Vacuum Machine Company |
| | | Rockford, Ill. |

[54] SEAT SLIDE CONSTRUCTION
7 Claims, 8 Drawing Figs.

[52] U.S. Cl. .................................................. 248/430
[51] Int. Cl. .................................................. B60n 1/08
[50] Field of Search ........................................ 248/430,
429, 408; 292/246, 256.69, 281; 85/11, 49

[56] References Cited
UNITED STATES PATENTS

| 582,186 | 5/1897 | Dorrance | 292/281 |
| 1,749,983 | 3/1930 | Nelson | 292/281 |
| 2,895,369 | 7/1959 | Anderson | 85/11 |
| 3,279,737 | 10/1966 | Krause | 248/430 |
| 3,450,425 | 6/1969 | Leonhardt | 248/430 |
| 3,476,429 | 11/1969 | Foote | 292/281 |
| 1,727,574 | 9/1929 | Tibbals | 85/49 |

Primary Examiner—Edward C. Allen
Attorney—Andrew F. Wintercorn

ABSTRACT: The latch members are of two-piece stamped sheet metal construction, in order that greater strength and holding power is obtainable, partly by reason of the closed rectangular form of the two-toothed notch engaging portion of the latch members, as contrasted with only an open U form where the two teeth are in the form of separate projecting tabs integral with and struck from the latch member and therefore susceptible of spreading under load. With the two-piece construction, in which a separate U-shaped tooth part is fastened to the latch member by hot staking or upsetting, this separate part can be and is preferably made from heavier gauge sheet metal for much greater strength and holding power, which is so important now that seatbelts are in general use attached usually to the seat, thereby placing far greater strains on the seat slide latch mechanism in the event of collision.

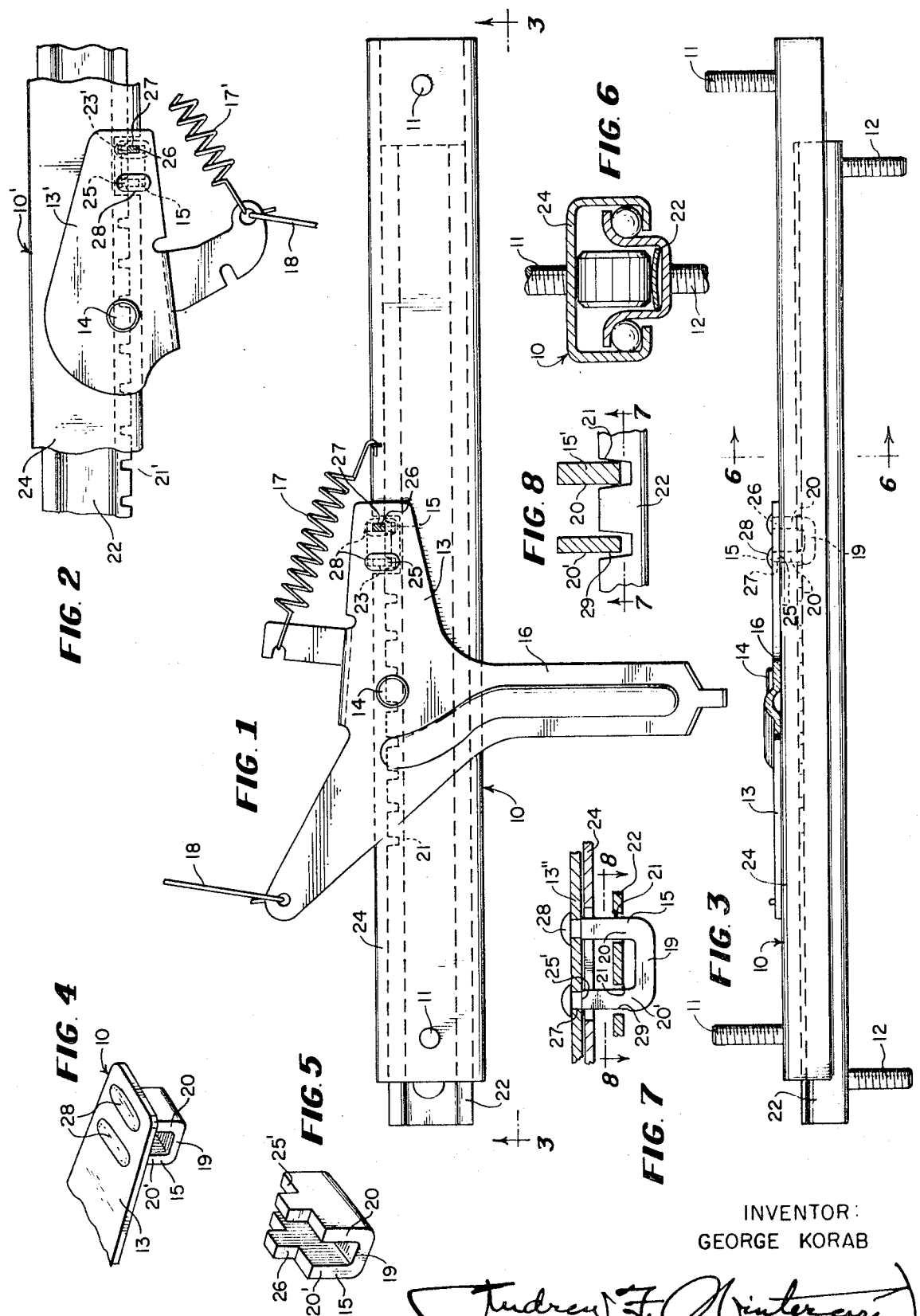

SEAT SLIDE CONSTRUCTION

This invention relates to seat slide structures for use with adjustable seats for vehicles such as automobiles, trucks, tractors, earth-moving machines, etc. and is particularly concerned with improved latching means for locking the seat securely in its adjusted position.

The sheet metal latch member of my invention have separate generally U-shaped tooth members secured thereto, the legs of which are spaced the same as the slots in the track so that double-locking engagement is made possible as before for greatly reduced wear and tear on the working parts and less likelihood of any eventual looseness and consequent rattle but greatly increased strength being obtained partly because the U-shaped tooth members can be and are made of a heavier gauge material than the latch members on which they are mounted and partly because of the closed rectangle design afforded by having both ends of the slot-engaging teeth cross-connected as contrasted with earlier designs of slot-engaging teeth in the form of separate projecting tabs, this added strength being especially important now that seatbelts have come into such general use and the anticipated loads imposed on seat latches are accordingly greatly increased.

The invention is illustrated in the accompanying drawing, in which:

FIG. 1 is a plan view of the left-hand one of a pair of seat slide structures incorporating the improvements of my invention, the right-hand one shown in FIG. 2 being substantially a duplicate, the principal difference being in the form of its latch member which is operated by cross-connection with the latch member on the left-hand seat slide structure in the usual way, so that a plan view of only that much of the right-hand slide structure is illustrated in FIG. 2;

FIG. 3 is a side view of FIG. 1;

FIG. 4 is a perspective view of the toothed end of the latch member shown in FIG. 1;

FIG. 5 is a perspective of the U-shaped tooth member;

FIG. 6 is a cross section on the line 6—6 of FIG. 3, and

FIG. 7 and 8 are enlarged sectional details on lines 7—7 and 8—8, respectively, FIGS. 8 and 7, showing a modified or alternative construction.

Similar reference numerals are applied to corresponding parts throughout these views.

Referring to the drawing, a seat slide structure embodying the improvements of my invention is indicated generally by the reference numeral 10 in FIGS 1, 3 and 4, a similar one being indicated generally by the reference numeral 10' in FIG. 2, two of these structures being provided in connection with each seat, attached to the bottom of the seat by means of bolts 11 or in any other suitable manner and secured to and supported on the floor on suitable brackets, to which the seat slide structures are secured by means of bolts 12 or in any other suitable manner. Both seat slide structures of a pair have sheet metal latch members 13 and 13' pivoted thereon, as at 14, each carrying a tooth member 15 of improved form, the latch member 13 for the left-hand seat slide structure including the hand-lever 16 extending to the left therefrom for manual operation from the driver's position to operate the two latch members 13 and 13' against the resistance of return springs 17 and 17', the two latch members being interconnected in the usual way by means of a cross-connecting link 18. The tooth members 15 are both stamped from sheet metal to U-shaped and the outer ends of the arms of the U are cross-connected by the latch members while the inner ends are cross-connected by the intermediate webs 19 for a closed rectangular design of far greater strength inherent in this design, as compared, for example, with the open U design obtained by tabs formed integral with the latch member as in Krause U.S. Pat. No. 3,279,737, even greater strength being obtained here by using heavier gauge sheet material in members 15 than is used in the latch members 13 and 13'. For instance, with only 0.145 inch material in members 15 as compared with 0.120 inch material in the latch member 13 and 13', more than twice the yield strength is obtainable than where the slot-engaging teeth are formed as tabs integral with the lighter gauge material used in the conventional latch members. As best seen in FIG. 5, the parallel legs 20–20' of each tooth member 15 define the two spaced latch teeth to operate in correspondingly spaced slots or notches 21 and 21' provided in one side of the lower channel member 22 of each seat slide structure to enable double locking engagement with both members 15. A notch 23 is provided in one side of the upper channel member 24 to accommodate the teeth 20–20', and a similar notch 23' is provided for the same reason in the upper channel 24 in the other seat slide structure 10', the inner ends of the notches 23 and 23' forming stops for abutment by the teeth 20 to limit oscillation of the latch members 13 and 13' under action of their springs 17 and 17', as indicated at 25. Tooth members 15 have shoulders 25' defined thereon at the upper ends of the teeth 20–20' to limit insertion of the attaching lugs 26 in the slots 27 in the latch members 13 and 13', and the protruding ends of the lugs are hot staked or upset, as indicated at 28, for permanently assembling the tooth members 15 on the latch members 13 and 13'. One of the upsets 28 in FIGS. 1 and 2 is broken away and shown in dotted outline in order to show the lug 26 and slot 27 in full lines, for purposes of better illustration.

In operation it is manifest, therefore, that with the double-locking engagement of the present latch means on both seat slide structures there is good distribution of the load to reduce wear and tear to a minimum, and that with the closed rectangular design of the teeth 20–20', cross-connected at both ends, there is such increased strength that is more than adequate to assume the greater load involved when seat belts are attached to the seat, as so many are now, and that when the slot-engaging teeth 20–20', are moreover, of heavier gauge material, as made possible with my new construction, the strength is increased well beyond any anticipated load requirements.

In FIGS. 7 and 8 I show a U-shaped tooth member 15', which, like member 15, is hot staked or upset as at 28 to the latch member 13'', and arranged to engage in spaced slots or notches 21 in one side of the fixed lower channel member 22 of the seat slide structure, member 15' differing, however, from member 15 in having the outer side 29 of the front tooth 20' coin-pressed to the depth of about five to ten thousandths of an inch, as best seen in FIG. 7, for three reasons:

1. to compensate for runout in quantity production of the stamped tooth members 15, and still be certain of having at least one of the two teeth, like tooth 20, having wedging engagement on both sides of the registering inwardly tapered notch or slot 21, so there can be no rattle;

2. to insure that when any unusual strain is imposed upon the latch, enough to cause any distortion, the other tooth 20' will have its coined side 29 come into engagement with the adjacent side of the notch or slot 21 to give the desired two-toothed engagement for maximum strength, the two teeth cross-connected at both ends being obviously much stronger than two teeth cross-connected at only one end, and 3. the coining of tooth 20' on one side 29 makes for closer grained metal and far longer wear than would otherwise be obtained.

It is believed the foregoing description conveys a good understanding of the objects and advantages of my invention. While a preferred embodiment of the invention has been illustrated and described, this is only for the purposes of illustration, and it is to be understood that various modifications in structure will occur to a person skilled in this art.

I claim:

1. In a seat slide structure comprising an elongated stationary horizontal lower slide member, an elongated horizontal seat supporting upper slide member slidably supported on said lower slide member in telescoping relation thereto, and a latch member of stamped sheet metal construction pivoted on said upper slide member engaging selectively in notches provided in uniformly longitudinally spaced relation in said lower slide member, the improvement which consists in the provision on said latch member of a separate one-piece metallic generally U-shaped tooth member of appreciably thicker and stronger material throughout in relation to the sheet metal of the latch member, the parallel arms of said tooth member providing two spaced teeth connected at one end in a fixed spaced parallel relation by their separate connections to the latch member and connected at the other end by the integral rigid cross portion of the U in a fixed spaced parallel relation, their spacing corresponding to the spacing of the aforesaid notches, the teeth being engageable always in two of said notches in different fore-and-aft adjustments of the seat, whereby to resist deformation of said teeth relative to said latch member under severe transverse loading and also distribute the load on said teeth and notches and thereby insure better holding action in the event of unusually severe strain tending to cause relative longitudinal movement between said slide members despite the locked position of said latch member.

2. A slide structure as set forth in claim 1, wherein the U-shaped tooth member is of stamped sheet metal construction, the latter being of heavier gauge material than the latch member to further increase resistance to deformation of said teeth relative to said latch member under severe transverse loading.

3. In a seat slide structure comprising an elongated stationary horizontal lower slide member, an elongated horizontal seat supporting upper slide member slidably supported on said lower slide member in telescoping relation thereto, and a latch member of stamped sheet metal construction pivoted on said upper slide member engaging selectively in notches provided in uniformly longitudinally spaced relation in said lower slide member, the improvement which consists in the provision on said latch member of a separate one-piece metallic generally U-shaped tooth member, the parallel arms of said tooth member providing two spaced teeth connected at one end in a fixed spaced parallel relation by their separate connections to the latch member and connected at the other end by the integral rigid cross portion of the U in a fixed spaced parallel relation, their spacing corresponding to the spacing of the aforesaid notches, the teeth being engageable always in two of said notches in different fore-and-aft adjustments of the seat, whereby to resist deformation of said teeth relative to said latch member under severe transverse loading and also distribute the load on said teeth and notches and thereby insure better holding action in the event of unusually severe strain tending to cause relative longitudinal movement between said slide members despite the locked position of said latch member, the U-shaped tooth member being of stamped sheet metal construction, the connection between one end of the teeth of the U-shaped tooth member and the latch member comprising lugs on the ends of the teeth entered closely in registering holes provided in the latch member, the lugs having outer end portions projecting through the holes the outer ends of which are upset to prevent displacement of said lugs from said holes.

4. A slide structure as set forth in claim 3, wherein the U-shaped tooth member is of heavier gauge sheet metal than the latch member to further increase resistance to deformation of said teeth relative to said latch member under severe transverse loading.

5. In a seat slide structure comprising an elongated stationary horizontal lower slide member, an elongated horizontal seat supporting upper slide member in telescoping relation thereto, and a latch member of stamped sheet metal construction pivoted on said upper slide member engaging selectively in notches provided in uniformly longitudinally spaced relation in said lower slide member, the improvement which consists in the provision of a pair of spaced parallel rectangular slots provided in said latch member, and a separate one-piece U-shaped tooth member formed of heavier sheet metal than that in said latch member and carried on said latch member, the two legs of the U defining two parallel teeth spaced the same as the slots in said latch member and also spaced the same as the aforesaid notches in which said teeth are engageable to distribute the load on said teeth and notches to insure better holding action in the event of any unusual strain tending to cause relative longitudinal movement between said slide members, said two legs being rigidly spaced and connected at one end by the cross portion of the U and having lugs of rectangular cross section on the other ends entered closely in and extending through said slots in said latch member for riveted connection therewith and for further connecting and rigidly spacing the teeth defined by said legs.

6. In a seat slide structure comprising an elongated stationary horizontal lower slide member, an elongated horizontal seat supporting upper slide member slidably supported on said lower slide member in telescoping relation thereto, and a latch member pivoted on said upper slide member engaging selectively in notches provided in uniform longitudinally spaced relation in said lower slide member, the improvement which consists in the provision on said latch member of a generally U-shaped tooth member, the parallel arms of which provide two spaced teeth connected at one end in a fixed spaced parallel relation to the latch member and connected at the other end by the cross portion of the U in a fixed spaced parallel relation, their spacing corresponding to the spacing of the aforesaid notches, the teeth being engageable always in two of said notches in different adjustments of the seat, whereby to resist deformation of said teeth relative to said latch member under severe transverse loading and also distribute the load on said teeth and notches and thereby insure better holding action in the event of unusually severe strain tending to cause relative longitudinal movement between said slide members despite the locked position of said latch member, the notches being of inwardly tapered form, and one of the two teeth of the generally U-shaped sheet metal tooth member having wedging engagement in one of two neighboring notches but the other tooth being compressed from one side to a predetermined depth both to make for closer grained metal, thus obtaining longer wear, and so as to obtain a predetermined clearance relative to the corresponding side of the other notch.

7. In a seat slide structure comprising an elongated stationary horizontal lower slide member, an elongated horizontal seat supporting upper slide member slidably supported on said lower slide member in telescoping relation thereto, and a latch member pivoted on said upper slide member engaging selectively in notches provided in uniformly longitudinally spaced relation in said lower slide member, the improvement which consists in the provision on said latch member of a generally U-shaped tooth member, the parallel arms of which provide two spaced teeth connected at one end in a fixed spaced parallel relation to the latch member and connected at the other end by the cross portion of the U in a fixed spaced parallel relation, their spacing corresponding to the spacing of the aforesaid notches, the teeth being engageable always in two of said notches in different adjustments of the seat, whereby to resist deformation of said teeth relative to said latch member under severe transverse loading and also distribute the load on said teeth and notches and thereby insure better holding action in the event of unusually severe strain tending to cause relative longitudinal movement between said slide members despite the locked position of said latch member, the notches being of inwardly tapered form, and one of the two teeth of the generally U-shaped sheet metal tooth member having wedging engagement in one of two neighboring notches but the other tooth being compressed from the outer side thereof to a predetermined depth both to make for closer grained metal, thus obtaining longer wear, and so as to obtain a predetermined clearance relative to the corresponding side of the other notch.

* * * * *